United States Patent [19]

Funk

[11] 3,749,372

[45] July 31, 1973

[54] YIELDABLE SUPPORT MEANS AND DRIVE MECHANISM FOR CONCRETE MIXER DRUMS

[75] Inventor: Joseph C. Funk, Coffeyville, Kans.

[73] Assignee: Funk Mfg. Company, Coffeyville, Kans.

[22] Filed: Jan. 27, 1972

[21] Appl. No.: 221,345

[52] U.S. Cl.................. 259/177 R, 74/574, 248/26
[51] Int. Cl. .............................................. B28c 5/18
[58] Field of Search................ 259/175, 176, 177 R, 259/177 A, 3, 14, 30, 57, 81, 89, 90; 74/574; 68/140; 248/7, 26, 15

[56] References Cited
UNITED STATES PATENTS

| | | |
|---|---|---|
| 2,878,689 | 3/1959 | Aebersold............................ 74/574 |
| 2,948,372 | 8/1960 | Goodlaxson ......................... 74/574 |
| 3,371,543 | 3/1968 | Jackson........................... 259/177 R |
| 3,509,393 | 4/1970 | Roddy................................. 248/26 |
| 3,658,303 | 4/1972 | Funk............................... 259/177 R |

Primary Examiner—Robert W. Jenkins
Attorney—William S. Dorman

[57] ABSTRACT

A drive mechanism for concrete mixer drums which includes a suitable gear reducing means or transmission having an output shaft rigidly secured to the mixer drum for transmitting rotation thereto. The transmission is supported by a yieldable or flexible annular support member interposed between the transmission housing and an outer ring which is secured to the truck or vehicle supporting the mixer drum.

10 Claims, 18 Drawing Figures

YIELDABLE SUPPORT MEANS AND DRIVE MECHANISM FOR CONCRETE MIXER DRUMS

BACKGROUND OF THE INVENTION

This invention relates to improvements in a drive mechanism for concrete mixer drums and more particularly, but not by way of limitation, to a drive mechanism having a yieldable support means interposed between the output shaft and a stationary support for absorbing vibrations of the rotating mixer drum.

As is well known, a rotating mixer drum carried on a vehicle causes oscillation of the output shaft which creates great strain on the vehicle structure. This has long been a problem in the industry in the destructive results thereof to the vehicle. The relatively large sizes of these mixer drums have rendered the solution to this problem very difficult.

SUMMARY OF THE INVENTION

The present invention contemplates a novel drive mechanism for concrete mixer drums which comprises a transmission having an output shaft rigidly secured to the mixer drum for transmitting rotation thereto. The transmission is operably connected with a power source through a suitable gear train for providing the desired rotational speed for the mixer drum, and the elements of the drive system are encased in a suitable housing, as is well known. The output shaft extends outwardly from the housing into connection with the mixer drum, and is supported by an annular flexible or yieldable support member which is interposed between the housing and an outer ring which in turn is rigidly secured to the vehicle. The variations and oscillations of the vehicle moving over uneven terrain may not only cause a misalignment of the drum with the longitudinal axis of the output shaft, but also may cause the shaft to wobble or oscillate during the rotation of the shaft and drum. Any misalignment of the drum which is transmitted to the shaft will be compensated for by the flexible or yieldable support member. In addition, the yieldable support member will absorb substantially all of the oscillations created by the mixer drum and preclude transmitting of these oscillations to the vehicle structure. The novel drive mechanism is simple and efficient in operation and economical and durable in construction.

DESCRIPTION OF THE PREFERRED EMBODIMENTS

Figure 1:
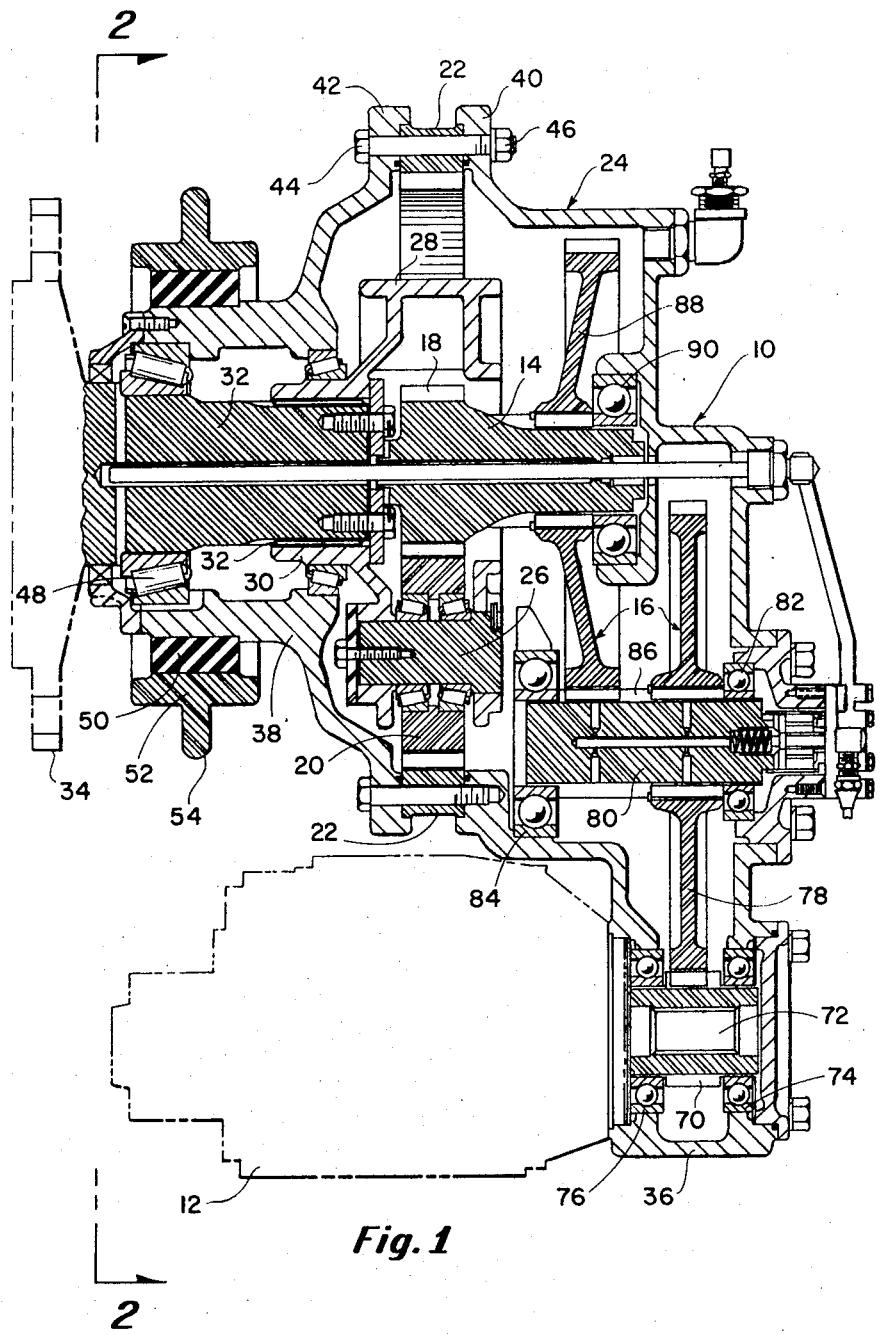
FIG. 1 is a sectional elevational view of a drive mechanism embodying the invention.
Figure 2:
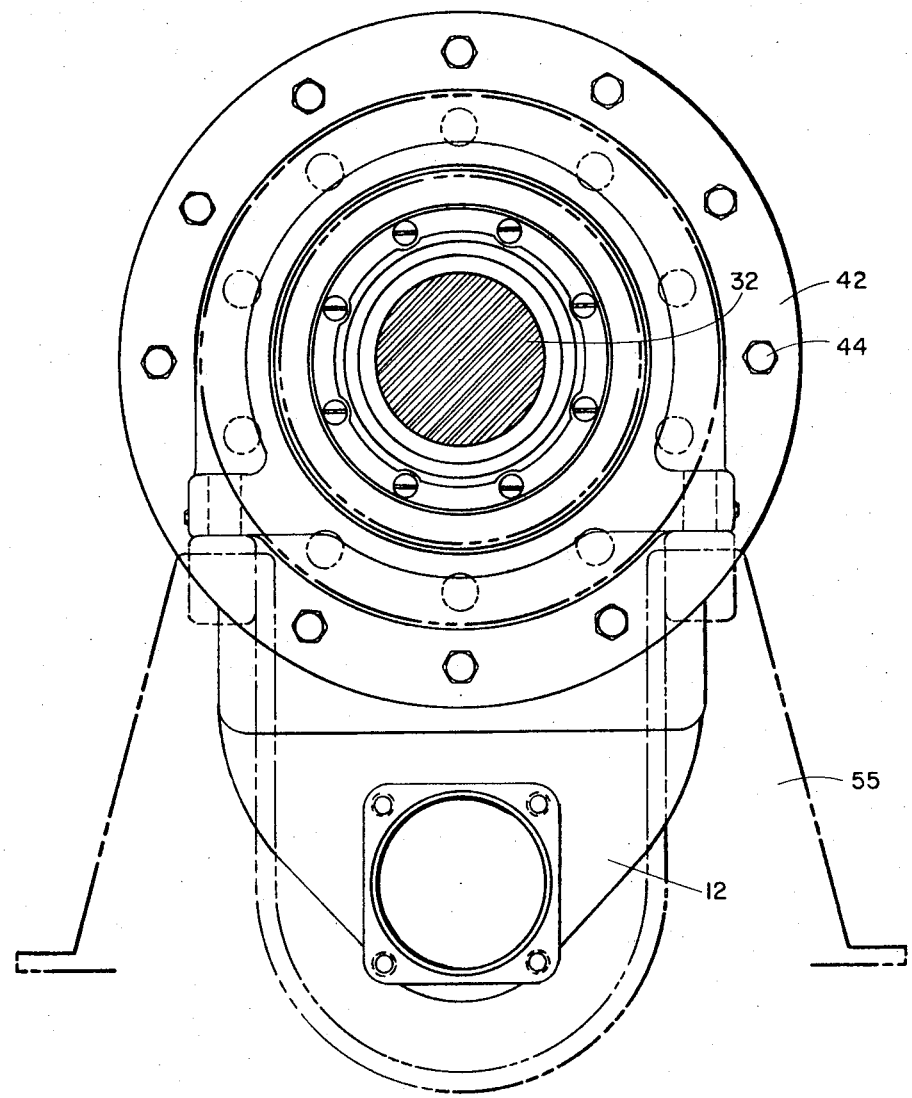
FIG. 2 is a view taken on line 2—2 of FIG. 1.
Figures 6A, 6B, 6C, 6D, 6E, 6F, 6G, 6H, 6I, 6J:
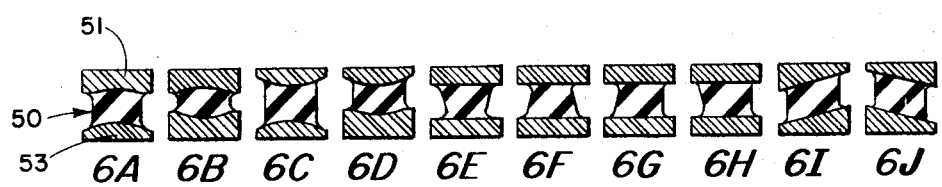
FIGS. 6A through 6J are sectional views of still further modifications of the yieldable support means of the invention.

Referring to the drawings in detail, and particularly FIGS. 1 and 2, reference character 10 generally indicates a drive mechanism comprising a suitable power source, such as a motor 12, connected with a drive shaft 14 through a suitable gear train generally indicated at 16. The drive shaft 14 is provided with a gear 18 on the left hand end thereof as viewed in FIG. 1 which is in meshing engagement with a plurality of planet gears 20 (only one of which is shown in FIG. 1). It is preferable to provide three of the gears 20 circumferentially spaced around the gear 18 and interposed between the gear 18 and an internally threaded ring gear 22 secured to an outer housing generally indicated at 24 in a manner as will be hereinafter set forth. The gears 20 are suitably journalled on pivot shafts 26 which are secured in circumferentially spaced relationship to an internal housing 28. An axially extending sleeve 30 is provided on the housing 28 for receiving a transmission output shaft 32 therein. The inner periphery of the sleeve 30 is provided with suitable splines or teeth 32 engagable with mating teeth or splines provided on the outer periphery of the shaft 32 for transmitting rotation therebetween. The shaft 32 extends outwardly from the housing 24 and is provided with an outwardly extending circumferential flange 34 which may be bolted or otherwise directed secured to the mixer drum (not shown).

As the shaft 14 is rotated by the gear train 16, the planet gears 20 are rotated by the gear 18. The gears 20 roll within the ring gear 22, thus transmitting rotation to the housing 30. The housing 30 transmits rotation to the shaft 32 through the gear teeth or splines 32. The rotation of the shaft 32 transmits rotation to the mixer drum (not shown) by means of the flange 34 which is rigidly secured to the drum.

The housing 24 may be of any suitable type, and as shown herein comprises a gear housing portion 36 and a shaft housing portion 38 each having complementary flanges 40 and 42, respectively, whereby the housing portions 36 and 38 may be secured together in any suitable manner, such as by the bolts 44 and complementary nuts 46, as is well known. The ring gear 22 is securely clamped between the flanges 40 and 42 as clearly shown in FIG. 1.

The shaft housing portion 38 is preferably substantially cylindrical and is concentrically disposed around the output shaft 32. Suitable bearings such as the tapered bearings 48 are interposed between the housing 38 and the shaft 32 whereby the shaft 32 is rotatably supported within the housing 38. It will be apparent that the housing 38 is non-rotatable due to the connection thereof with the gear housing 36, which is also non-rotatable as will be hereinafter set forth.

A resilient, flexible, or yieldable substantially annular elastomer member 50 is disposed around the outer periphery of the housing 38, and is preferably constructed from rubber, or any other suitable elastomer material. The inner periphery of the ring 50 is preferably bonded in any well known manner to the outer periphery of the housing 38. In addition, a substantially cylindrical outer ring 52 is disposed around the outer periphery of the ring 50 and is provided with an outwardly extending radial flange 54 which is rigidly secured to the vehicle (not shown) upon which the mixer drum is mounted. It is preferable to bolt, or otherwise secure the flange 54 to the usual pedestal 55 (FIG. 2) normally provided on the vehicle for mounting of the mixer drum thereon. The outer periphery of ring 50 is preferably bonded in any well known manner to the inner periphery of the support ring 54. Thus, the ring 54 is securely and rigidly secured to the vehicle independently of the housing 38, and the housing 38 is yieldably supported in the rigidly supported ring 54 by the elastomer or yieldable member 52. Substantially all oscillations or shock transmitted to the housing portion 38 by the output shaft 32 will be absorbed by the flexible or yieldable member 50, thus greatly reducing vibrations and resulting damage being transmitted to the vehicle itself.

Figure 3:
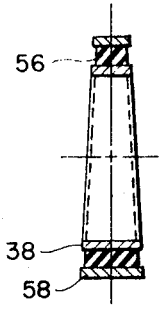
FIGS. 3, 4 and 5 are sectional elevational views of modified forms of the yieldable support means of the invention.

Whereas the yieldable member 50 as shown in FIGS. 1 and 2 is substantially cylindrical, with the inner and outer and inner peripheries thereof being substantially concentric, it is to be understood that the cross-sectional configuration of the elastomer may be of substantially any desired configuration. For example, as shown in FIG. 3, an elastomer 56 is shown wherein the longitudinal dimension of the lower portion thereof is substantially greater than the longitudinal dimension of the upper section thereof, thus providing a generally wedge-shaped configuration for the element 56. Of course, in this instance, it may be preferable to provide a support ring 58 of a substantially wedge-shaped configuration complementary with the configuration of the elastomer 56 in lieu of the substantially straight cylindrical configuration of the support ring 52. Of course, the ring 58 will be similarly rigidly secured to the vehicle (not shown). One advantage of the particular configuration of the elastomer 58 is that the greatest mass or volume of the element 58 is disposed at the lower portion of the housing element 38 which, of course, is the portion thereof which supports the greatest amount of the weight of the mixer drum through the supporting of the shaft 32.

Figure 4:
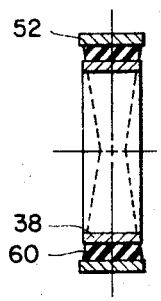

As shown in FIG. 4, another elastomer element 60 is shown which is of a substantially hour-glass configuration, with the upper and lower portions thereof being of a greater longitudinal dimension than the central or side portions thereof. In this instance, the support ring 52 may be efficiently utilized since both the upper and lower portions of the elastomer 60 are of a substantially equal length. The greatest volume of the elastomer 60 is at the upper and lower portions of the housing 38, thus providing an efficient support for the housing within the ring 52.

Figure 5:
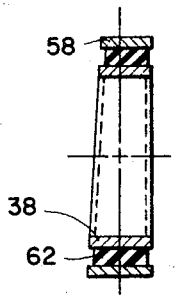

FIG. 5 depicts another elastomer element 52 which is generally similar to the elastomer 56. However, the difference in the longitudinal dimdnsion of thd u;per portion of the element 56 and thd lower portion thereof is not as great as is the case in the elastomer. 56.

Not only is it anticipated that the overall or general configuration of the elastomer 50 may vary, as desired, but also it is anticipated that the cross-sectional configuration of the ring itself may vary. An example of several cross-sectional configurations for the elastomer 50 are depicted in FIGS. 6A through 6J. From an inspection of FIGS. 6A through 6J, it will be apparent that the elastomer 50 may comprise a pair of concentrically disposed metallic rings 51 and 53 and the configuration of the inner periphery of the ring 51 and the outer periphery of the rings 52 may be straight, concave, convex, or angularly disposed, if desired, and the inner and outer peripheries of the yieldable element or elastomer 50 may be complementary to the configuration of the housing 38 and sleeve or support member 52. Substantially any combination of the cross-sectional configurations shown in FIGS. 6A through 6J with the various overal configurations of the elastomer, as shown in FIGS. 3, 4 and 5, may be utilized, as desired, to provide a yieldable support for the housing 38 and output shaft 32 in the support ring 50.

Figure 7:
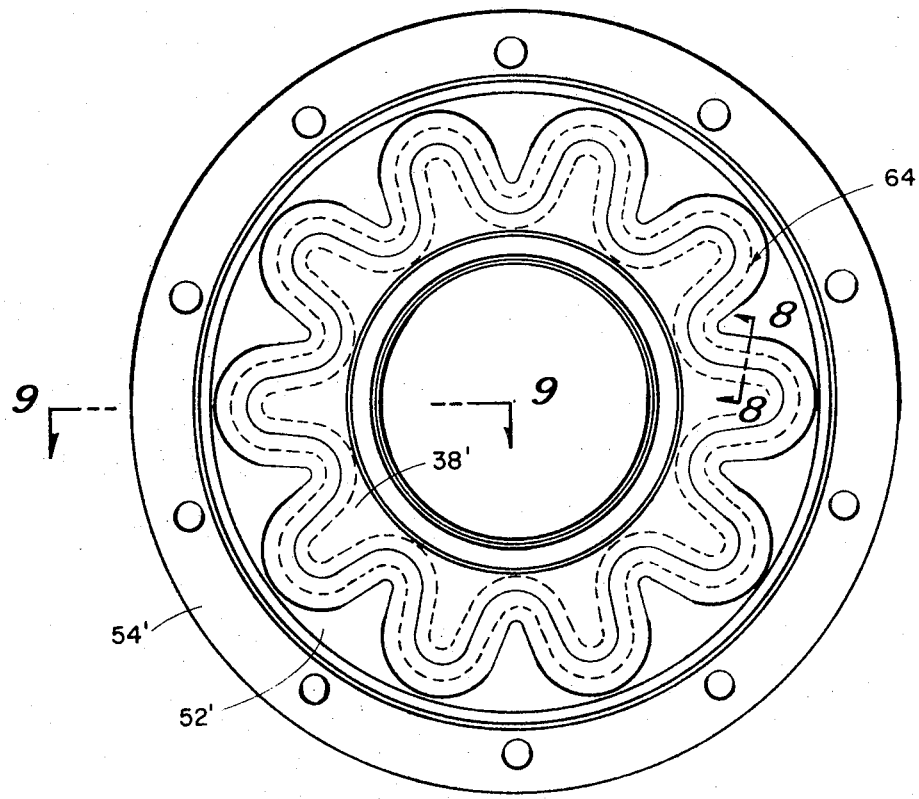
FIG. 7 is a front elevational view of a modified yieldable support member embodying the invention.
Figure 8:
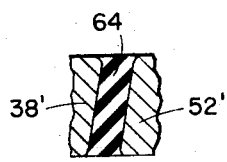
FIG. 8 is a view taken on line 8—8 of FIG. 7.
Figure 9:
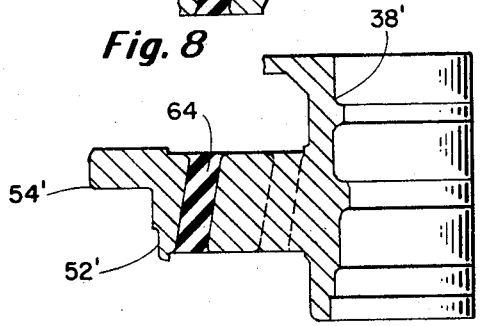
FIG. 9 is a view taken on line 9—9 of FIG. 7.

Rdferring now to FIGS. 7, 8 and 9, still another type of elastomer is generally indicated at 64. The elastomer 64 is of a substantially annular undulated configuration, or star-shaped configuration as particularly shown in FIG. 7. One of the principle advantages of this configuration is that the elastomer 64 or rubber material thereof is put in compression instead of in shear for torque loads. the elastomer 64 is interposed between a housing 38', generally similar to the housing 38, and a support ring 52', generally similar to the ring 52. Howdvdr, in this instance, the outer periphery of the housing 38' is undulated complementary to the configuration of the elastomer 64, and thd inner periphery of the ring 50' is correspondingly undulated whereby the elastomer 64 may be bonded therebetween for yieldably supporting the housing 38' and output shaft 32 in the support ring 52'. The ring 52' is also preferably provided with an outwardly extending radial flange 54' generally similar to the flange 54 for securing the ring 52' to the pedestal 55 (FIG. 2) or any other desired portion of the vehicle (not shown).

Referring again to FIG. 1, whereas the gear train 16 may be of any suitable or well known type, the particular arrangement depicted herein comprises a drive gear 70 suitably secured to a drive shaft 72 of thd motor 12. The drive shaft 72 is journalled in the gear housing 36 by suitable bearings 74 and 76 for free rotation with respect thereto. The drive gear 70 is in meshing or driving engagement with a gear 78 which is keyed or otherwise secured to a shaft 80 which is rotatably supported in the gear housing 36 by suitable bearings 83 and 84. The outer periphery of the shaft 80 is splined, as shown at 86, and is in meshing or driving engagement with a gear 88 which is keyed or otherwise secured to the shaft 14. The shaft 14 is rotatably supported in the gear housing 36 by a suitable bearing unit 90. It will be readily apparent that rotation of the drive shaft 72 causes the drive gear 70 to transmit rotation to the gear 78, which in turn rotates the shaft 80 for rotating the gear 88, which in turn rotates the shaft 14. The shaft 14 transmits rotation to the planet gears 20 which roll around the inner periphery of the ring gear 22 thus transmitting rotation to the inner housing element 28. The sleeve portion 30 of the housing element 28 drives the output shaft 32 for transmitting rotation to the mixer drum (not shown) by virtue of the rigid connection between the shaft 32 and the drum. The speed of rotation of the drum with respect to the rotation of the drive 72 may the regulated substantially as desired by selecting the proper gear ratios in the gear train 16, as is well known. Of course, a suitable lubricant may be provided within the housings 36 and 38 for surrounding the gears and rotatable elements, as is well known, for assuring an efficient operation of the drive mechanism 10.

As the mixer drum is rotated during the mixing of concrete, or the like, the great weight and forces created by the turning of the mixer drum normally transmits oscillations to the output shaft 32. The shaft 32 may be rotated in a manner whereby the rotation thereof is not concentric about its own longitudinal axis and may be erratic in ction. The gear housing 36 is preferably suitably mounted on the vehicle (not shown) as is well known, and is non-rotatable with respect thereto. The motor 12 may be an auxiliary power plant, or may be the engine of the vehicle as desired, and as the motor 12 drives the output shaft 32 for rotation of the mixer drum, it will be apparent that the shaft housing 38 will remain non-rotatable during rotation of the shaft 32. However, the housing 38 will be shifted in position slightly during the erratic movements of the shaft 32 in response to the action of the mixer drum. These erratic movement or oscillations of the housing 38 will be substantially absorbed by the flexible or yieldable elastomer element 50, and will not be transmittdd to the ring 52, thus substantially precluding transmission of the forces of the oscillation and the like between the drum and the vehicle.

From the foregoing, it will be apparent that the present invention provides a novel yieldable support means and drive mechanism for concrete mixer drums. The device comprises a support member rigidly secured to the vehicle upon which the mixer drum is mounted. The support member receives a shaft housing and rotatable output shaft therethrough, said output shaft being rigidly connected with the mixer drum for transmitting rotation thereto. An elastomer element is bonded between the stationary support member and the shaft housing in a manner for absorbing substantially all oscillations or erratic movement of the housing with respect to the vehicle, thus greatly reducing the transference of stresses between the drum and the vehicle.

Whereas the described invention has been escribed in particular relation to the drawings attached hereto, it should be understood that other and further modifications, apart from those shown or suggested herein, may be made within the spirit and scope of this invention.

What is claimed is:

1. A drive mechanism for vehicle mounted concrete mixer drums and comprising a power source, a rotatable output shaft rigidly secured to the mixer drum, gear train means interposed between the power source and the output shaft for transmitting rotation thereto, non-rotatable housing means supporting the rotatable output shaft, support means disposed around the housing means and rigidly secured to the vehicle, yieldable means interposed between the housing means and support means for absorbing substantially all of the relative movement of the housing means with respect to the support means.

2. A drive mechanism for vehicle mounted concrete mixer drums as set forth in claim 1 wherein the yieldable means comprises a substantially annular elastomer member bonded between the housing means and support means.

3. A drive mechanism for vehicle mounted concrete mixer drums as set forth in claim 1 wherein the yieldable means is of a substantially annular configuration and of a substantially over-all wedge-shaped side configuration whereby the greater volume thereof is disposed at the lower portion of the housing means for efficiently supporting the weight of the mixer drum and absorbing vibrations thereof.

4. A drive mechanism or vehicle mounted concrete mixer drums as set forth in claim 1 wherein the yieldable means comprises a pair of concentrically spaced metallic rings having a yieldable matdrial bonded therebetween, one of said metallic rings being supported by the support means, and the other of said metallic rings supporting the non-rotatable housing means.

5. A drive mechanism for vehicle mounted concrete mixer drums as set forth in claim 4 wherein the annular space between the metallic rings is of a substantially arcuate cross-sectional configuration.

6. A drive mechanism for vehicle mounted concrete mixer drums as set forth in claim 4 wherein the annular space between the metallic rings is substantially conical in cross-sectional configuration.

7. A drive mechanism for vehicle mounted concrete mixer drums as set forth in claim 4 wherein the annular space between the metallic rings is substantially cylindrical.

8. A drive mechanism for vehicle mounted concrete mixer drums as set forth in claim 4 wherein the inner periphery of one metallic ring is concave and the outer periphery of the other metallic rings is convex.

9. A drive mechanism for vehicle mounted concrete mixer drums as set forth in claim 4 wherein the inner periphery of one metallic ring is convex and the outer periphery of the other metallic ring is concave.

10. A drive mechanism for vehicle mounted concrete mixer drums as set forth in claim 1 wherein the yieldable means comprises a generally circular undulated flexible member interposed between the housing means and support means.

* * * * *